July 24, 1962 J. KOLLING 3,045,340

METHOD OF MAKING A GAS-TIGHT INTEGRAL TUBE PANEL

Filed July 30, 1957 2 Sheets-Sheet 1

INVENTOR.
JOHANN KOLLING
BY
*JPMoran*
ATTORNEY

July 24, 1962 J. KOLLING 3,045,340

METHOD OF MAKING A GAS-TIGHT INTEGRAL TUBE PANEL

Filed July 30, 1957 2 Sheets-Sheet 2

INVENTOR.
JOHANN KOLLING
BY
*J. P. Moran*
ATTORNEY

United States Patent Office 3,045,340
Patented July 24, 1962

3,045,340
METHOD OF MAKING A GAS-TIGHT INTEGRAL TUBE PANEL
Johann Kolling, Oberhausen, Rhineland, Germany, assignor to The Babcock & Wilcox Company, New York, N.Y., a corporation of New Jersey
Filed July 30, 1957, Ser. No. 675,089
Claims priority, application Germany Aug. 1, 1956
6 Claims. (Cl. 29—471.1)

This invention relates to gas-tight tube panels or walls, such as used in tubular heat exchangers, and more particularly to a novel method of making such a panel or wall and to the article produced by such method.

Integral gas-tight tube panels for use as components of tubular heat exchangers have been produced by welding techniques. Heat exchanger components of this type have been used, for example, as combustion chamber walls, in radiant heat absorption sections, and in gas passes.

In forming integral tube panels by welding techniques, the adjacent tubes may be welded directly to each other if the inter-tube spacing is sufficiently small. With greater inter-tube spacings, filler strips are disposed between the tubes and welded to the adjacent tubes. In some cases, additional filler metal is used in welding the strips to the tubes. In all cases, the welds must be of such character that they not only form firm mechanical bonds uniting all the tubes into an integral panel unit but also form gas tight seals between adjacent tubes or between the tubes and the interposed filler strips.

These known welding techniques for forming integral tube panels are, however, relatively expensive in terms of welding energy and manpower requirements since the attainment of gas tight joints between the tubes, as well as joints having adequate mechanical strength at all points along the lengths of the tubes requires thorough fusion and penetration in the welds at all points along the lengths of the tubes. Attainment of such thorough fusion and penetration at all points requires high heat input at all points with resultant high welding temperatures throughout the entire lengths of the tube joints.

The required high heating not only reduces the welding speed but also results in decided distortion in the completed panel. All of these factors, including subsequent straightening of the panel, materially increase the cost of each panel and, where such panels constitute a substantial part of the heat exchanger, materially increase the cost of the latter.

In accordance with the present invention, the costs of forming integral gas-tight tube panels or walls by welding techniques are greatly reduced, and the distortion due to high heat inputs is substantially eliminated, by initially joining the tubes to each other or to interposed spacer strips by a series of strength welds spaced longitudinally of the tubes and preferably made at the points where the tubes would normally be temporarily tack welded to each other or to the spacer strips. Subsequently, the spaces between adjacent tubes or between the tubes and the spacer strips are filled by seal welds to make a gas-tight tube panel.

The initial series of spaced strength welds may be of such a nature as to provide all of the mechanical strength necessary to maintain the tubes, or tubes and spacer strips, integrally united into a self-supporting tube panel, with the subsequent seal welds merely acting as gas-tight seals for the spaces between the initial welds. However, as the seal welds have a certain amount of mechanical strength, it is preferred to so form the initial series of strength welds as to provide only part, preferably a major part, of the mechanical strength requisite to provide a self-supporting tube panel, and to provide the balance of the requisite mechanical strength by the seal welds. Thereby, advantage is taken of the relatively greater amount of metal in the seal welds.

Among the advantages of this procedure is the reduced overall heating of the tube panel due to the fact that high temperature heating for thorough fusion occurs only at the series of longitudinally spaced strength welds, thus reducing the amount of tube panel metal subjected to heating to the fusion temperature to a minor fraction of the amount of tube panel metal subjected to high temperature heating with known techniques as previously used. Consequently, warping of the panel is substantially eliminated.

As the seal welding, which is performed only after completion of the strength welds, need not involve as thorough a fusion as the strength welds, the heating of the tube panel metal is carried only to a much lower temperature than is necessary for the strength welds. The material used for the seal welds may be one which forms a gas tight seal at a much lower welding temperature, and the seal welds could even be formed by brazing. Not only is the temperature involved greatly reduced in the seal welding but also the seal welds are effected much more rapidly, thus substantially eliminating any tendency of the panel to warp during the seal welding.

Finally, the time and labor required to weld the panel are greatly reduced. The spaced strength welds may be formed by manual welding, but require comparatively little time and labor due to the substantially reduced amount of metal fused to form the strength welds. The seal welds may be rapidly formed by automatic welding heads operated in multiple.

For an understanding of the invention principles, reference is made to the following description of typical embodiments thereof as illustrated in the accompanying drawings. In the drawings.

Referring first to FIGS. 1 through 4, a plurality of tubes 10 to be joined to form an integral tube panel or wall are arranged in closely spaced parallel relation. The tubes 10 are then joined to each other by longitudinally spaced strength welds 11 preferably located at the points where tubes 10 normally would be temporarily tack welded to each other.

Figure 2:
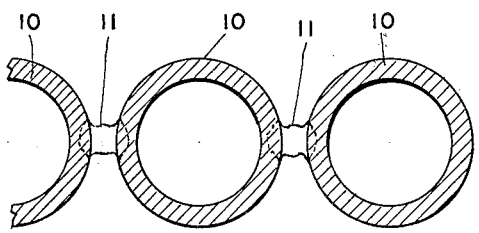
FIG. 2 is an enlarged sectional view on the line 2—2 of FIG. 1.

Strength welds 10 preferably are made by hand welding with a high heat input sufficient to secure adequate penetration into the base metal of tubes 10, as best illustrated in FIG. 2. The welding operations are performed in such a manner that welds 11 supply at least the major part of the mechanical strength required to maintain tubes 10 united into an integral tube panel.

Figure 1:
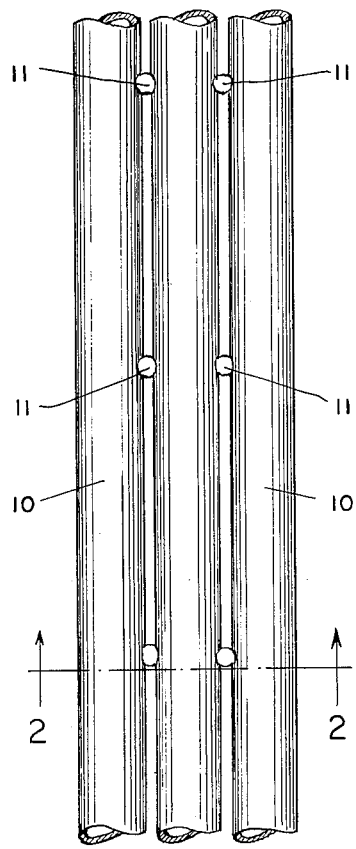
FIG. 1 is a plan view of tubes arranged to form a tube weld and directly united to each other by spaced strength welds.
Figure 3:
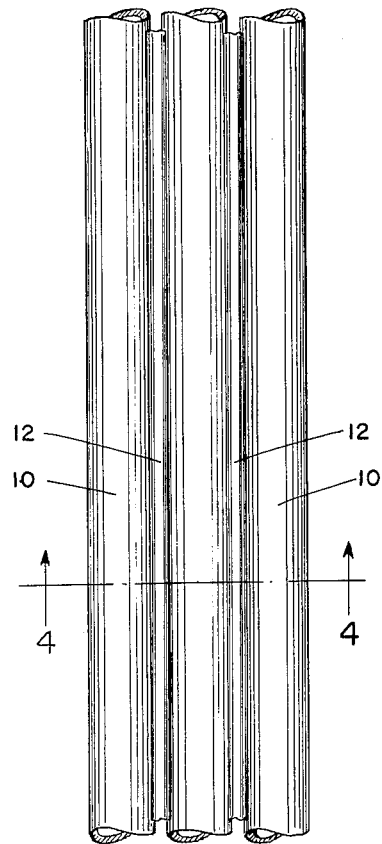
FIG. 3 is a plan view of the panel after seal welding.
Figure 4:
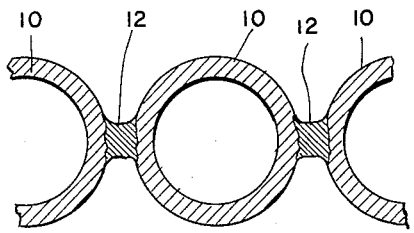
FIG. 4 is an enlarged sectional view on the line 4—4 of FIG. 3.
Figure 5:
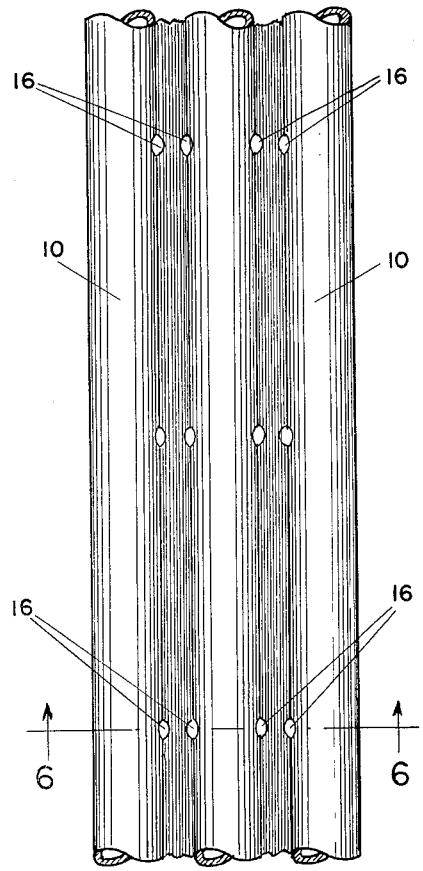
FIG. 5 is a view similar to FIG. 1 of a tube panel incorporating spacer strips.
Figure 7:
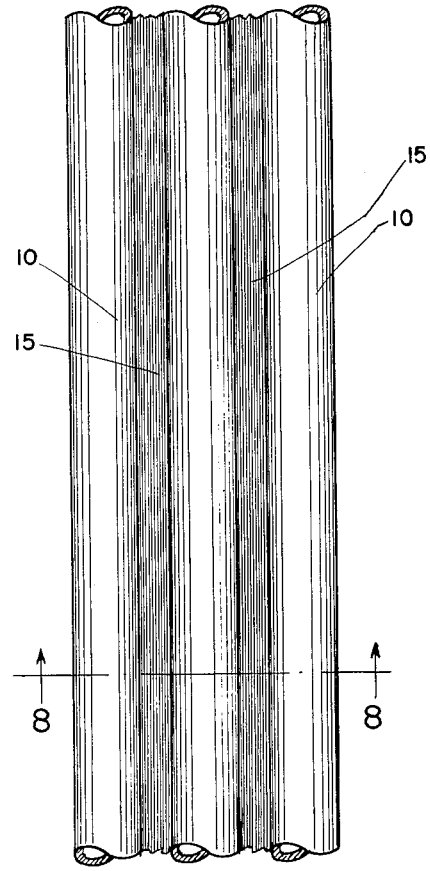
FIG. 7 is a plan view of the panel of FIG. 5 after seal welding.
Figure 6:
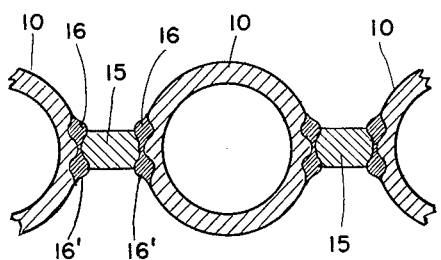
FIG. 6 is an enlarged sectional view on the line 6—6 of FIG. 5.
Figure 8:
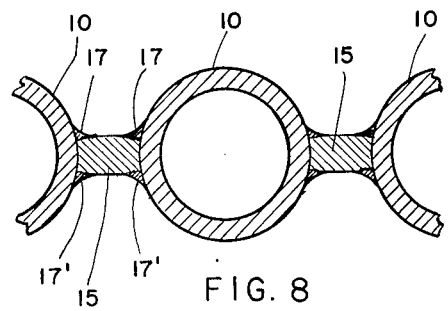
FIG. 8 is an enlarged sectional view on the line 8—8 of FIG. 7.

After the tubes are thus joined into a self-supporting tube panel by the strength welds 11, the inter-tube spaces are made gas-tight by seal welds 12, 12', as shown in FIGS. 3 and 4. These seal welds may be formed by automatic welding heads moving along the inter-tube spaces, and a plurality of such welding heads may be used in multiple to form all the seal welds on one side of the panel in one pass along the panel.

Seal welds 12, 12' are made much more rapidly, and with a much lower heat input, than are strength welds 11. The principal requirement is that the seal welds make the inter-tube spaces gas-tight. However, the seal welds have at least some mechanical strength in holding the tubes 10 in panel formation, and thus can be relied upon to furnish part of the strength requirements of the panel, supplementing the strength welds 11 in this respect.

Due to the fact that the high heat input strength welds 11 being made only at spaced points along the tubes, and due to the seal welds 12, 12' being made at high speed with a relatively low heat input, warping and distortion of the panel are kept at a minimum. Additionally, the time and labor required to form the panel are greatly reduced.

FIGS. 5–8 show the invention as applied to form a panel where spacer strips are interposed between the welds. Referring to these figures, tubes 10 are initially joined to spacer strips 15 by spaced strength welds 16, 16' formed in the same manner as strength welds 11. Subsequently, the panel is made gas-tight by seal welds 17, 17' formed in the same manner as seal welds 12, 12'.

Spacer strips 15 may be continuous throughout the length of tubes 10, or short spacer strips or lugs may be spaced along the lengths of the tubes, and may be rectangular, circular, or any desired cross-section. The seal welds may be made by arc welding or by oxy-fuel gas welding, and in some cases the sealing may be effected by brazing.

While specific embodiments of the invention have been shown and described in detail to illustrate the application of the invention principles, it will be understood that the invention may be embodied otherwise without departing from such principles.

What is claimed is:

1. The method of making a gas-tight integral tube panel composed of a plurality of substantially parallel tubes, said method comprising the steps of uniting said tubes into a panel by a series of fusion strength welds spaced longitudinally of the tubes and formed at a heat input sufficient to obtain fusion with and penetration into the base metal of the tubes; and thereafter forming seal welds along the tubes sealing the intertube spaces gas-tight with the seal welds being formed at a heat input substantially less than that involved in forming the strength welds.

2. The method of making a gas-tight integral tube panel composed of a plurality of substantially parallel tubes, said method comprising the steps of uniting said tubes into a panel by a series of fusion strength welds spaced longitudinally of the tubes and formed at a heat input sufficient to obtain fusion with and penetration into the base metal of the tubes, said strength welds providing at least a major part of the mechanical strength necessary to maintain said tubes united into a self-supporting integral tube panel; and thereafter forming seal welds along the tubes sealing the intertube spaces gas-tight with the seal welds being formed at a heat input substantially less than that involved in forming the strength welds.

3. The method of making a gas-tight integral tube panel composed of a plurality of substantially parallel tubes, said method comprising the steps of uniting said tubes into a panel by a series of fusion strength welds spaced longitudinally of the tubes and formed at a heat input sufficient to obtain fusion with and penetration into the base metal of the tubes, said strength welds providing at least a major part of the mechanical strength necessary to maintain said tubes united into a self-supporting integral tube panel; and thereafter forming seal welds along the tubes sealing the intertube spaces gas-tight with the seal welds being formed at a heat input substantially less than that involved in forming the strength welds, said seal welds providing the remaining part of the mechanical strength necessary to maintain said tubes united into a self-supporting integral tube panel.

4. The method of making a gas-tight integral tube panel composed of a plurality of substantially parallel tubes, said method comprising the steps of disposing spacer strips between adjacent tubes; uniting said tubes to said strips by a series of fusion strength welds spaced longitudinally of the tubes and formed at a heat input sufficient to obtain fusion with and penetration into the base metal of the tubes; and thereafter forming seal welds between the tubes and strips sealing the intertube spaces gas-tight with the seal welds being formed at a heat input substantially less than that involved in forming the strength welds.

5. The method of making a gas-tight integral tube panel composed of a plurality of substantially parallel tubes, said method comprising the steps of disposing spacer strips between adjacent tubes; uniting said tubes to said strips by a series of fusion strength welds spaced longitudinally of the tubes and formed at a heat input sufficient to obtain fusion with and penetration into the base metal of the tubes, said strength welds providing at least a major part of the mechanical strength necessary to maintain said tubes and strips united into a self-supporting integral tube panel; and thereafter forming seal welds between the tubes and strips sealing the intertube spaces gas-tight with the seal welds being formed at a heat input substantially less than that involved in forming the strength welds.

6. The method of making a gas-tight integral tube panel composed of a plurality of substantially parallel tubes, said method comprising the steps of disposing spacer strips between adjacent tubes; uniting said tubes to said strips by a series of fusion strength welds spaced longitudinally of the tubes and formed at a heat input sufficient to obtain fusion with and penetration into the base metal of the tubes, said strength welds providing at least a major part of the mechanical strength necessary to maintain said tubes and strips united into a self-supporting integral tube panel; and thereafter forming seal welds between the tubes and strips sealing the intertube spaces gas-tight with the seal welds being formed at a heat input substantially less than that involved in forming the strength welds, said seal welds providing the remaining part of the mechanical strength necessary to maintain said tubes and strips united into a self-supporting integral tube panel.

References Cited in the file of this patent

UNITED STATES PATENTS

| | | |
|---|---|---|
| 1,236,145 | Burns | Aug. 7, 1917 |
| 2,319,487 | Baldwin | May 18, 1943 |
| 2,660,155 | Chapman | Nov. 24, 1953 |
| 2,719,210 | Chapman | Sept. 27, 1955 |
| 2,745,169 | Scheldorf | May 15, 1956 |
| 2,782,495 | Beck et al. | Feb. 26, 1957 |
| 2,817,981 | Brownell | Dec. 31, 1957 |